United States Patent Office 3,336,167
Patented Aug. 15, 1967

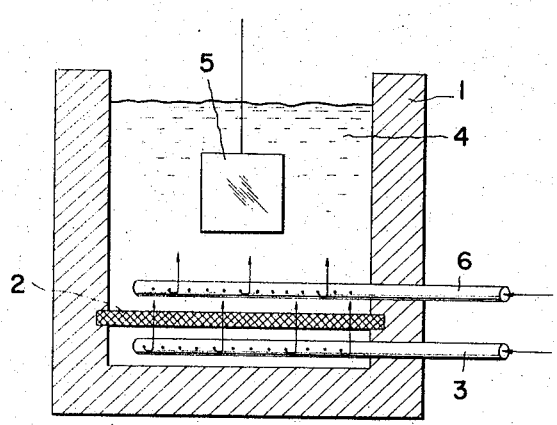

3,336,167
PROCESS FOR TREATMENT OF SURFACES OF IRON AND STEEL
Yukio Tanaka, Tokyo-to, Japan, assignor to Kokusai Denki Kabushiki Kaisha (known as Kokusi Electric Co., Ltd.), Tokyo-to, Japan, a joint-stock company of Japan
Filed June 16, 1964, Ser. No. 375,531
Claims priority, application Japan, June 26, 1963, 38/32,888
1 Claim. (Cl. 148—16.5)

This invention relates to an improved process for surface treatment (for example, nitriding, carburization and sulfurizing treatments) for iron and steel by the utilization of a surface treating gas and has the general object of providing a novel process by which the surface of iron and steel can be treated rapidly and easily.

It is well known in the art to use suitable treating gases such as $NH_3$, $C_3H_8$ and $H_2S$ in the process of surface treatment of iron and steel stocks, such as nitriding, carburization and sulfurizing treatments. In these treatments it is essential to select proper concentrations of the treating gases in order to provide the metals being treated with the desired surface structure. Thus, for example, in the nitriding treatment it is necessary to maintain the concentration of $NH_3$ gas at a proper value at the treating temperature.

The process of surface treatment embodying the principle of this invention is characterized by the steps of introducing a hydrogenated gas $H_mQ_n$ of an element (generally designated by Q) which is to be caused to permeate into iron and steel stocks into a flow bed above which carbon black is caused to be fluidized by means of air, maintaining the flow bed at a treating temperature, and steeping therein iron or steel stocks to be treated. Among the hydrogenated gases $H_mQ_n$, the following compounds have been found to be suitable.

For nitriding; $NH_3$ ($m=3, n=1$, ammonia gas).
For carburization; $C_3H_8$ ($m=8, n=3$, propane gas).
For sulfurizing; $H_2S$ ($m=2, n=1$, hydrogen sulfide).

This invention may be more clearly understood by referring to the accompanying drawing in which a single figure illustrates an apparatus suitable for use in carrying out this invention.

In the drawing, there is shown a furnace 1 provided with an air-pervious bottom plate 2 and an air inlet pipe 3 through which air is introduced into the furnace to fluidize a carbon black bed 4 within the furnace 1. An iron or steel stock which is to be surface treated is dipped in the fluid bed 4. It is to be understood that the fluid bed 4 is maintained at the desired temperature by heating the furnace 1 by a suitable means, for example, by placing the furnace 1 within a fluidizing carbon bed electric furnace. Of course, other heating systems may be adopted. An inlet pipe 6 is provided to introduce the treating gas into the fluid carbon black bed 4.

The operation as well as novel features of the present process are as follows:

Due to the addition of $O_2$ contained in the air introduced through the inlet pipe 3, the composition of the substances in the fluid carbon black bed which is maintained at the treating temperature will be carbon black powder, $N_2$, and $CO_2$ (or CO). Dependent upon the type of treatment desired, when the required treating gas, for example, $NH_3$ in the case of nitriding, is introduced, said substances in the flow fluid bed and the treating gas will be mixed uniformly to effect the desired nitriding with a relatively small amount of $NH_3$. If the carbon black were fluidized by $NH_3$ gas alone, the concentration of the activated N on the surface of an article to be treated would become too high, thus resulting in an unsatisfactory nitriding. According to this invention, however, as $CO_2$ (or CO) gas serves to dilute this $NH_3$ gas, the desired result can be obtained with a small amount of $NH_3$.

Similarly, $C_3H_8$ gas and $H_2S$ gas are respectively supplied as the treating gases for effecting carburization and sulfurizing. In each case, the particular treating gas is diluted adequately by $CO_2$ (or CO) gas which is formed in the fluid bed, whereby a satisfactory treatment can be attained.

Utilization of carbon black in accordance with this invention will result in an automatic gas transformation reaction between $O_2$ contained in the fluidizing air and the carbon black, thereby producing said $CO_2$ (or CO) gas. Owing to its physical property, the carbon black will remove, by adsorption, $H_2$ gas which is the decomposition product of the treating gas, thereby contributing to the elimination of the action of surplus $H_2$ to decrease the desired surface treatment. Thus, the surface of an article to be treated is chemically wetted by the activated element which is to be caused to permeate thereinto, thereby greatly accelerating the speed of the surface treatment.

It is preferred, according to the invention, to heat the fluidized bed to a temperature of from 300 to 900° C. Yet more preferred is to employ a temperature of from 500 to 650° C. for nitriding with ammonia, 600 to 900° C. for carburization with propane and 300 to 600° C. for sulfurization with hydrogen sulfide.

In order to indicate still more fully the nature of the invention, the following examples of representative procedure are set forth.

*Example 1*

By way of illustration the invention will be described as being applied to nitriding treatment of iron or steel. Carbon black having a grain size of from 20 to 80 meshes was used. The rate of air flow was approximately 0.03 liter per minute per $cm.^2$ of the bottom plate of the fluid bed while the flowrate of $NH_3$ gas was about 0.03 liter per minute per $cm.^2$ in the fluid bed above the bottom plate thereof. As the material to be treated, an alloyed die steel was selected in the form of a circular disc having a diameter of 18 mm. and a thickness of 10 mm. After maintaining the article in the treating bed at 500° C. for 30 minutes, a nitride layer was obtained having a thickness of about 0.06 mm. and a surface hardness of 1300 Vicker's hardness number.

*Example 2*

A cylinder of low-carbon steel of 18-mm. diameter and 10-mm. height was subjected to carburization treatment for three hours in the fluid carbon black bed according to the invention at a treatment temperature of 900 degrees C. while fluidizing air was supplied into the bed at a flowrate of 0.02 liter/min./$cm.^2$, and $C_3H_8$ gas was supplied into the bed at a flowrate of 28 liters/min. The resulting carburization layer on the surface of the steel cylinder was found to have a thickness (or depth) of approximately 0.2 mm.

*Example 3*

A block of cast iron having the dimensions of 3 x 3 x 1 cm. was subjected to sulfurizing treatment for 3 hours in the fluid carbon black bed according to the invention at a treatment temperature of 570° C. while fluidizing air was supplied into the bed at a flowrate of 0.04 liter/min./$cm.^2$, and $H_2S$ gas was supplied into the bed at a flowrate of 16 liters/min. The resulting sulfurized layer on the surface of the cast iron block was found to have a thickness (or depth) of approximately 0.1 mm.

As will be clearly understood from the foregoing description, the process of this invention is advantageous in that the rate of surface treating of iron or steel is increased, and that with a minimum amount of treating gas, ample effect of surface treatment can be obtained.

In accordance with the provisions of the patent statutes, I have explained the principle and operation of my invention and have illustrated and described what I consider to represent the best embodiments thereof. However, I desire to have understood that within the scope of the appended claim, the invention may be practiced otherwise than as specifically illustrated and described.

What is claimed is:

A process of treating the surface of a ferrous article comprising immersing the article in a bed of carbon black particles contained in a furnace provided with a bottom, introducing air into the furnace through the bottom to fluidize the bed of carbon black particles, introducing ammonia gas into the furnace at a position above the bottom thereof and therefore directly into the fluidized bed and heating the fluidized bed to a temperature of from 500 to 650° C.

References Cited

UNITED STATES PATENTS

| | | | |
|---|---|---|---|
| 2,186,690 | 1/1940 | Widner | 148—16.5 |
| 3,053,704 | 9/1962 | Munday | 148—13.1 X |
| 3,096,221 | 7/1963 | Tanka | 148—16.6 X |
| 3,099,589 | 7/1963 | Tanka | 148—16.5 X |
| 3,197,346 | 7/1965 | Munday | 148—13.1 X |

OTHER REFERENCES

Metals Handbook, published by ASM 1948 edition, relied on pp. 688–692.

CHARLES N. LOVELL, *Primary Examiner.*

HYLAND BIZOT, DAVID L. RECK, *Examiners.*